US008266596B2

(12) United States Patent
Ishikawa et al.

(10) Patent No.: US 8,266,596 B2
(45) Date of Patent: Sep. 11, 2012

(54) SOURCE CODE ANALYZING SYSTEM AND SOURCE CODE ANALYZING METHOD

(75) Inventors: Yuji Ishikawa, Tokyo (JP); Yutaka Ota, Kanagawa (JP); Yu Nakanishi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 409 days.

(21) Appl. No.: 12/713,817

(22) Filed: Feb. 26, 2010

(65) Prior Publication Data

US 2011/0055818 A1    Mar. 3, 2011

(30) Foreign Application Priority Data

Aug. 26, 2009  (JP) .................................. 2009-195859

(51) Int. Cl.
*G06F 9/44*      (2006.01)
(52) U.S. Cl. ......... 717/128; 717/127; 717/131; 717/140
(58) Field of Classification Search .................. 717/127, 717/128, 131, 140
See application file for complete search history.

(56) References Cited

U.S. PATENT DOCUMENTS

| | | | | |
|---|---|---|---|---|
| 5,432,795 A | * | 7/1995 | Robinson | ...................... 717/125 |
| 5,488,714 A | * | 1/1996 | Skidmore | ...................... 717/143 |
| 6,173,442 B1 | * | 1/2001 | Agesen et al. | ................. 717/141 |
| 7,243,193 B2 | * | 7/2007 | Walmsley | ...................... 711/154 |
| 7,552,427 B2 | | 6/2009 | Adiletta et al. | |
| 7,716,642 B1 | * | 5/2010 | Michael et al. | ............... 717/124 |

FOREIGN PATENT DOCUMENTS

| | | |
|---|---|---|
| JP | 5-119960 | 5/1993 |
| JP | 2008-523514 | 7/2008 |
| WO | WO 2006/065689 A1 | 6/2006 |

OTHER PUBLICATIONS

Refugio Jones, "Big Endian to Little Endian Data Conversion Using 3.3V Bus Switches", Aug. 18, 1999.*
Jiang et al., "Data Conversion for Process/Thread Migration and Checkpointing", 2003.*

* cited by examiner

*Primary Examiner* — Phillip H Nguyen
(74) *Attorney, Agent, or Firm* — Oblon, Spivak, McClelland, Maier & Neustadt, L.L.P.

(57) ABSTRACT

Every time an assignment statement is executed during performing a simulation according to a second variable memory system, it is determined whether a value interpreted to have the same meaning is assigned to the assignment statement in the simulation according to a first variable memory system and in the simulation according to the second variable memory system. When the value interpreted to have the same meaning is not assigned, the value assigned according to the second variable memory system is overwritten by an expected value, and a report indicating that the assignment statement is a part dependent on a variable memory system is output.

20 Claims, 12 Drawing Sheets

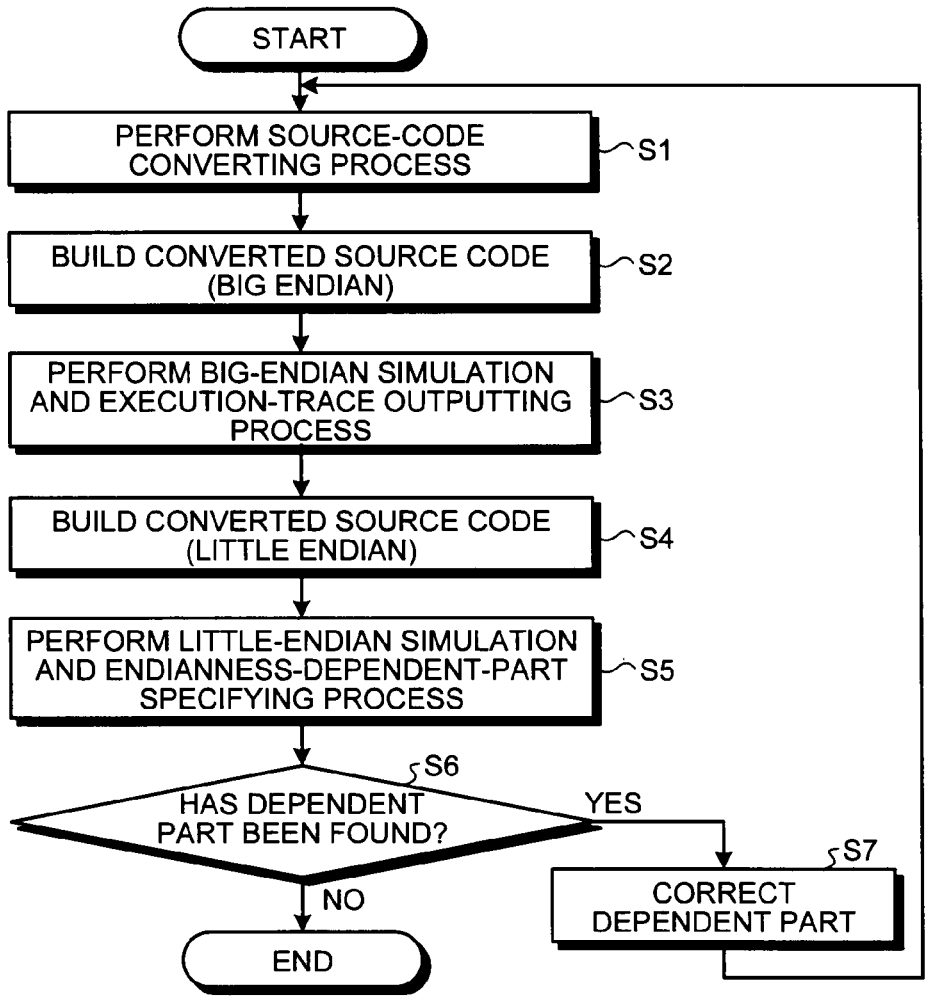

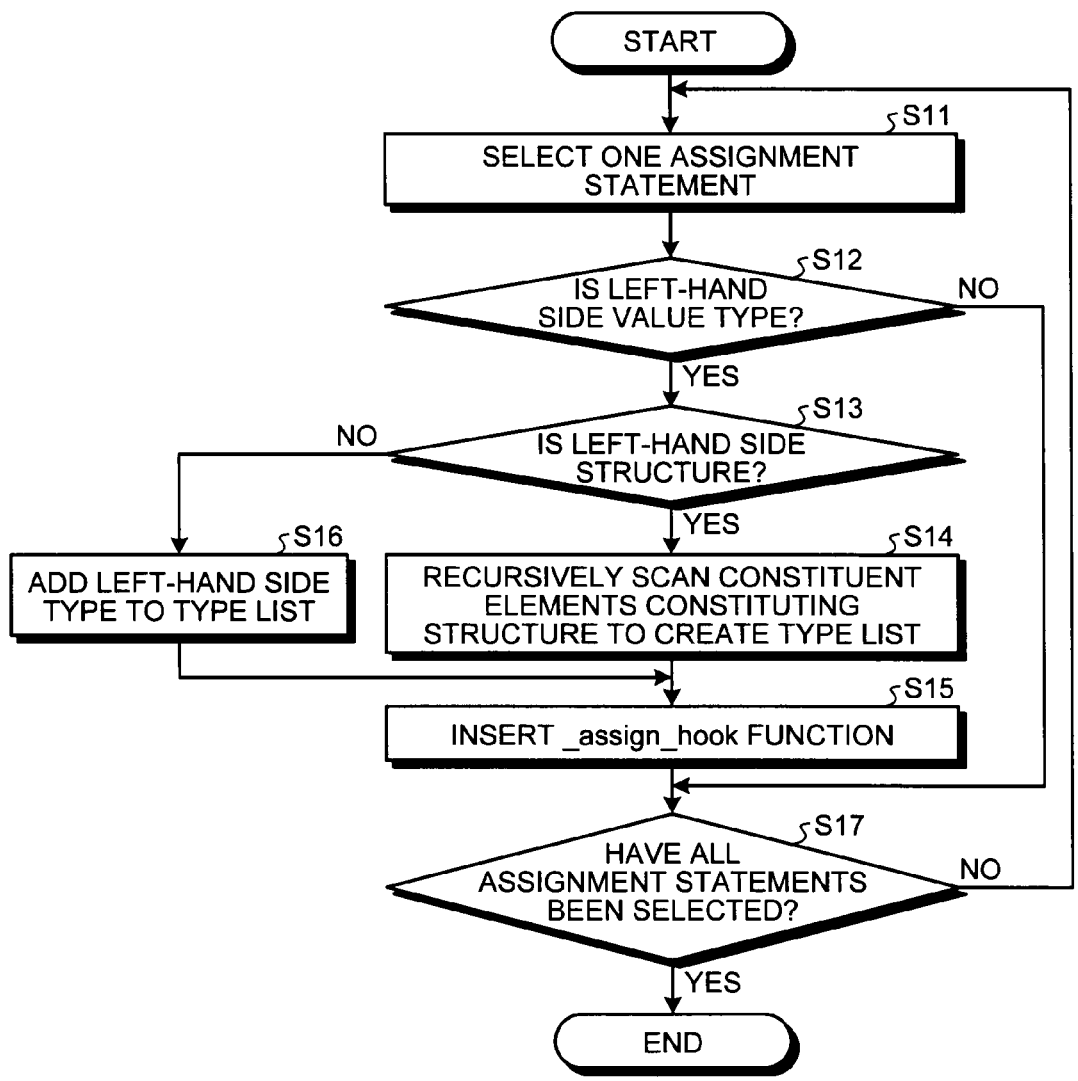

FIG.5A

```
/* IMPLEMENTATION EXAMPLE OF _assign_hook FUNCTION (PSEUDO CODE)*/
01:
02: void __assign_hook(POINTER    LEFT-HAND-VALUE REFERENCE ADDRESS,
03:                    LOCATION   POSITION OF ASSIGNMENT STATEMENT,
04:                    INTEGER    TOTAL NUMBER OF BYTES ASSIGNED,
05:                    LIST       LIST OF ELEMENTS CONSTITUTING
                                  ASSIGNMENT TYPE
06:                  );
```

FIG.5B

```
01:/* SOURCE BEFORE INSERTION (sample.c)*/
02: unsigned long a[4];
03: unsigned long *pa;
04:
05: pa = a;
06: *pa = b + c;
```

FIG.5C

```
01:/* SOURCE AFTER INSERTION (sample_hooked.c)*/
02: unsigned long a[4];
03: unsigned long *pa;
04:
05: pa = a;  /*IGNORE ASSIGNMENT OF REFERENCE TYPE*/
06: (*pa = b+c,
       __assign_hook(LEFT-HAND-VALUE REFERENCE ADDRESS =&(*pa),
                     POSITION OF ASSIGNMENT STATEMENT ={"sample.c", 6},
                     TOTAL NUMBER OF BYTES ASSIGNED =4,
                     LIST OF ELEMENTS CONSTITUTING ASSIGNMENT TYPE
                     ={T_INT32})
                    )
    );
07:
```

```
/* structcopy.c*/
01: typedef struct _sample_struct {
02:   char arg0, arg1;
03:   short arg2;
04:   long arg3;
05: } st_sample;
06:
07: const st_sample src = {0x01, 0x02, 0x1234, 0x12345678};
08: void initstructure(st_sample *dest){
09:   *dest = src;
10: }
```

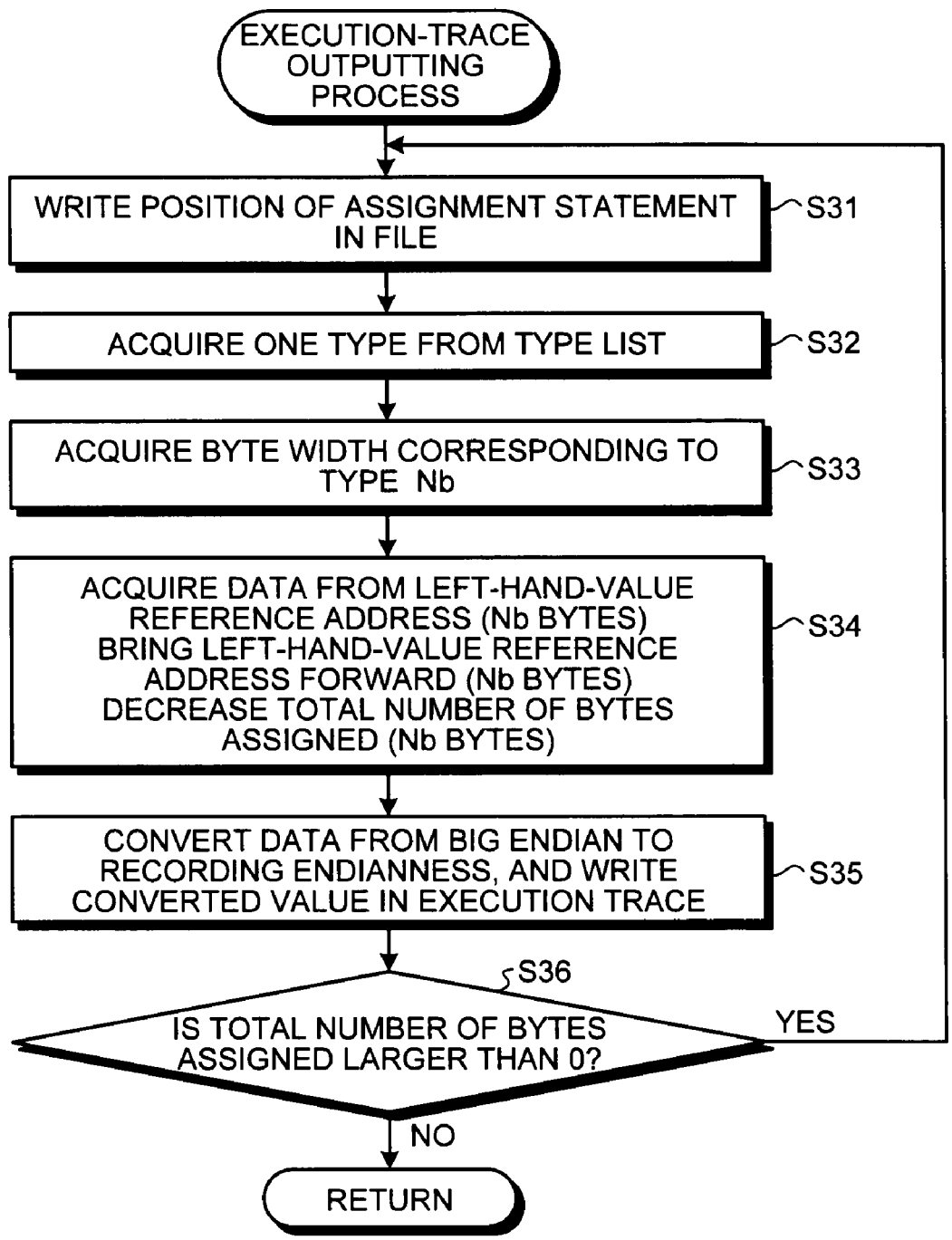

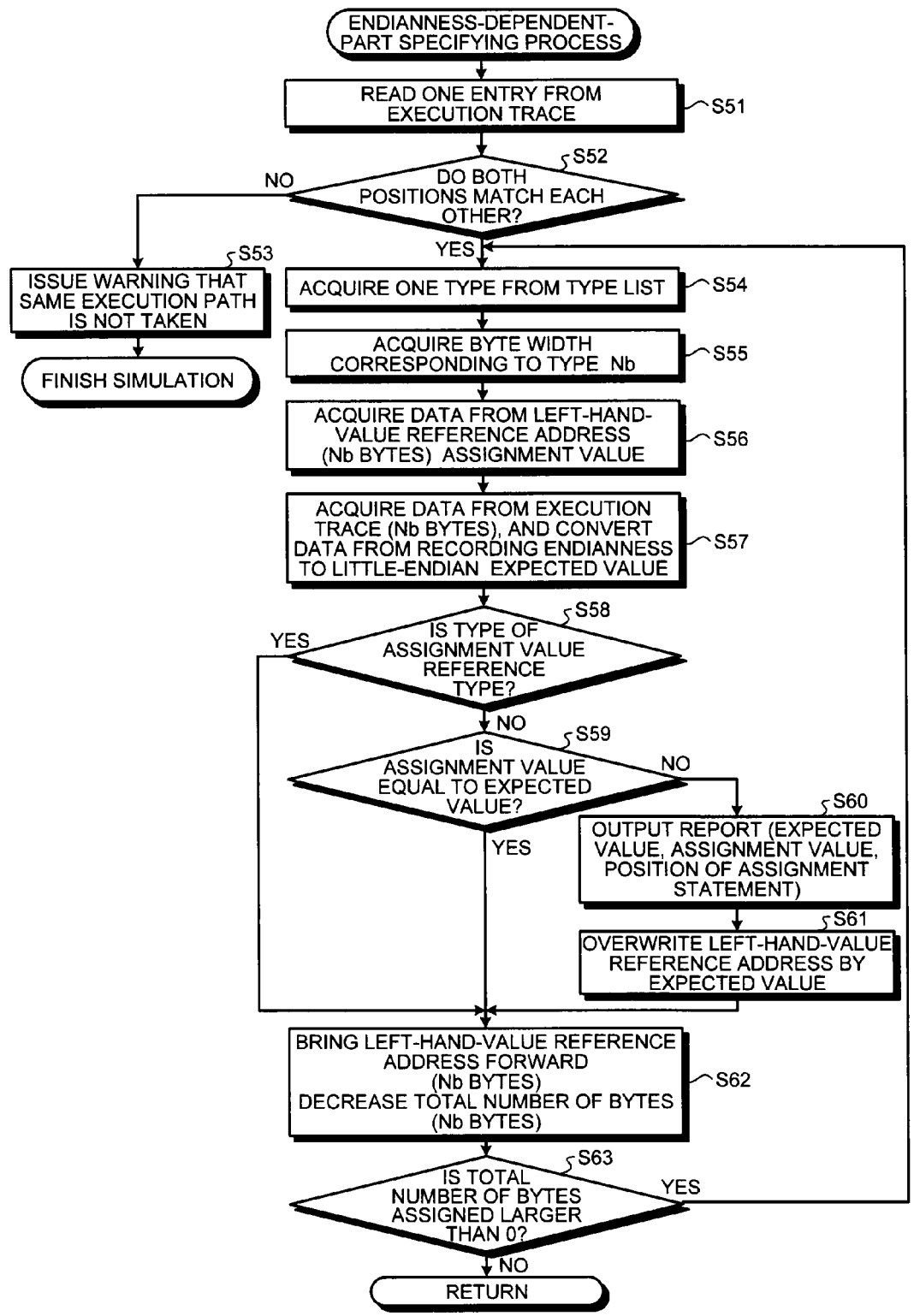

FIG.9

```
/*
  ASSUMED THAT BYTE SEQUENCE {0x00, 0x10} IS STORED AT
  ADDRESS INDICATED BY BUFFER
*/
01: unsigned short *buffer;
02: unsigned short temp, temp2;
03:
04: temp = *buffer;
05:
06: temp2 = temp/2;
07:
08: if(temp<0xFF) {
09:   temp2 += 0x100;
10: }
11: else{
12:   temp2 -= 0x100;
13: }
```

FIG.10

| LINE NUMBER | ASSIGNMENT DESTINATION | EXPECTED VALUE ACCORDING TO BIG-ENDIAN | ASSIGNMENT VALUE ACCORDING TO LITTLE-ENDIAN | ENDIANNESS DEPENDENCE DETERMINATION |
|---|---|---|---|---|
| 04 | temp | 0x0010 | 0x1000 | THERE IS DEPENDENCE, OVERWRITE BY 0x0010 |
| 06 | temp2 | 0x0008 | 0x0008 | NO DEPENDENCE |
| 09 | temp2 | 0x0108 | 0x0108 | NO DEPENDENCE |
| (CONTINUED) | | | | |

FIG.11

| LOCATION | EXPECTED VALUE | ASSIGNMENT VALUE | (NOTE) |
|---|---|---|---|
| "sample.c", line 4 | 0x0010 | 0x1000 | CORRECT DETERMINATION |
| (CONTINUED) | | | |

FIG.12

| LINE NUMBER | ASSIGNMENT DESTINATION | EXPECTED VALUE ACCORDING TO BIG-ENDIAN | ASSIGNMENT VALUE ACCORDING TO LITTLE-ENDIAN | ENDIANNESS DEPENDENCE DETERMINATION |
|---|---|---|---|---|
| 04 | temp | 0x0010 | 0x1000 | THERE IS DEPENDENCE |
| 06 | temp2 | 0x0008 | 0x0800 | THERE IS DEPENDENCE |
| 09 | temp2 | 0x0108 | | (NINTH LINE IS NOT TAKEN ACCORDING TO LITTLE-ENDIAN) |
| 12 | temp2 | | 0x700 | SAME PATH CANNOT BE TAKEN FINISH SIMULATION |

FIG.13

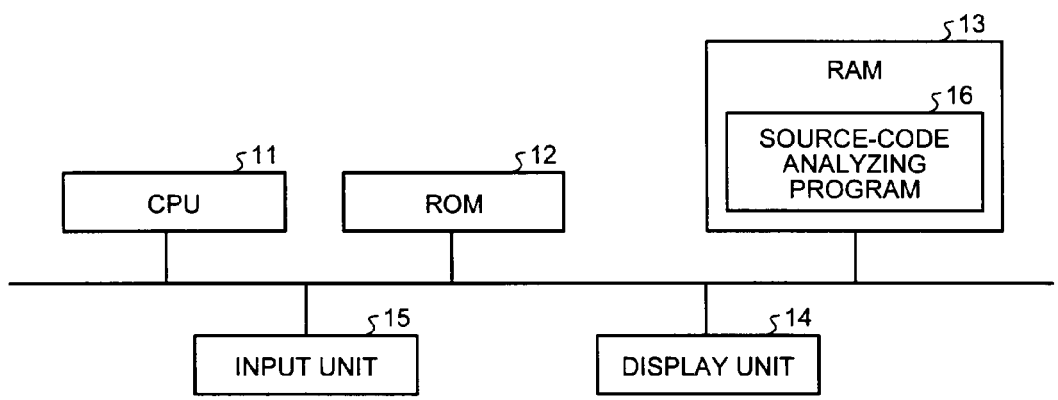

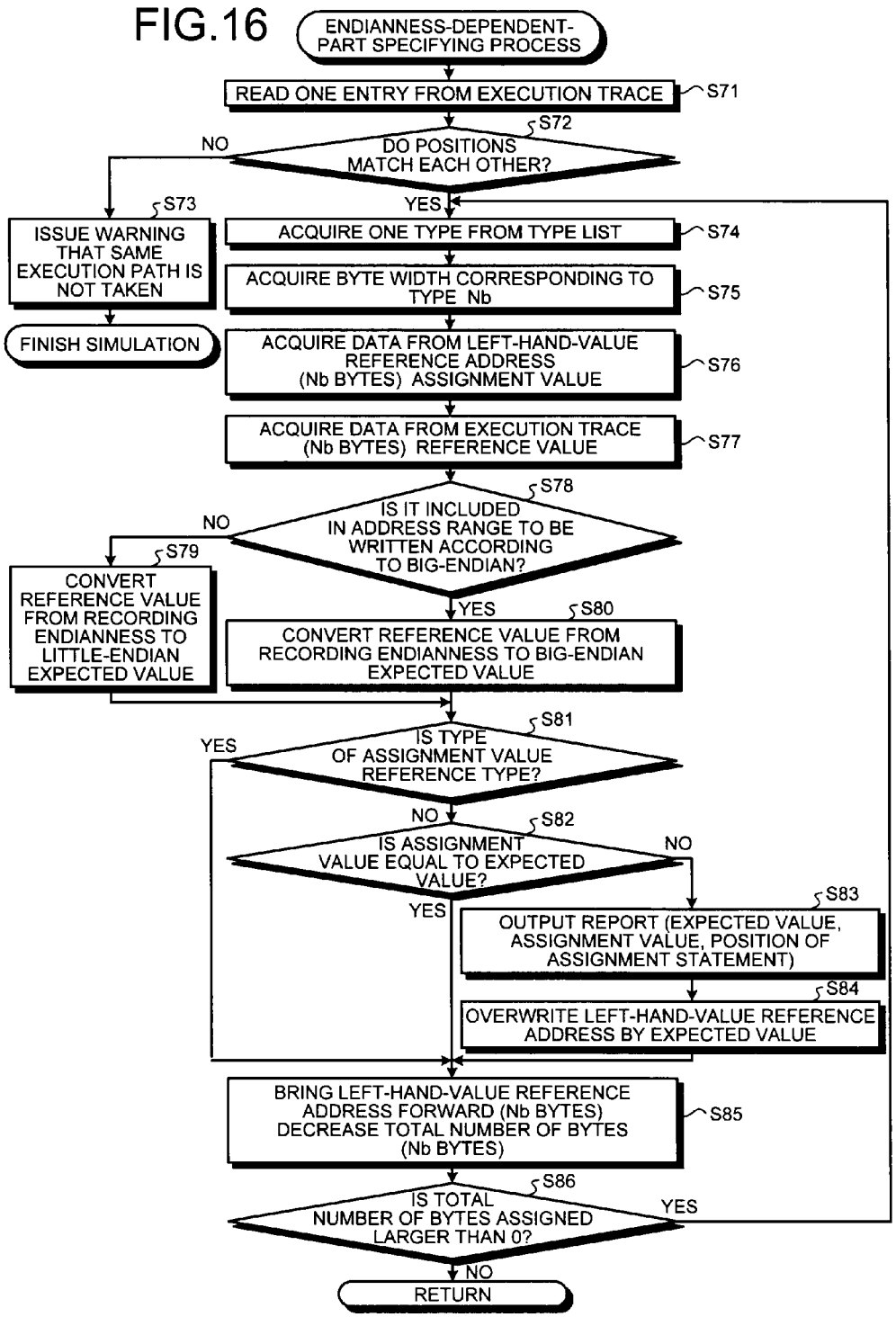

SOURCE CODE ANALYZING SYSTEM AND SOURCE CODE ANALYZING METHOD

CROSS-REFERENCE TO RELATED APPLICATIONS

This application is based upon and claims the benefit of priority from the prior Japanese Patent Application No. 2009-195859, filed on Aug. 26, 2009; the entire contents of which are incorporated herein by reference.

BACKGROUND OF THE INVENTION

1. Field of the Invention

The present invention relates to a source code analyzing system and a source code analyzing method.

2. Description of the Related Art

When a processor writes multibyte data in a memory having a byte unit address, there is flexibility with respect to a storage order of data (a variable memory system). As a generally used storage order, there are systems such as a system of sequentially describing bytes from the least significant byte (little Endian system) and a system of sequentially describing bytes from the most significant byte (big Endian system). If it is assumed that an integer in hexadecimal notation is described as 0x1234 by attaching 0x at the head, and a byte sequence arranged continuously on a memory is described as 0x12, 0x23 by separating the byte with a comma sequentially from a byte positioned in a small address, for example, an integer 0x12345678 is described as 0x78, 0x56, 0x34, and 0x12 according to the little-endian system, whereas it is described as 0x12, 0x34, 0x56, and 0x78 according to the big-endian system. Such a storage order of multibyte data is simply referred to as "endianness".

As it is attempted to read a 4-byte integer value 0x12345678 written in the big-endian system as a 4-byte integer value in the little-endian system, a value 0x78563412 can be acquired. Therefore, if a program written by assuming a processor based on the big-endian system is directly operated in a processor based on the little-endian system, malfunction can occur in read and write of a memory.

The multibyte data can be read and written, assuming a specific storage order, by combining a byte access and a shift operation. In this case, it is possible to describe software that does not depend on endianness of a processing system. However, a decrease in processing speed cannot be avoided due to an increase in the number of memory accesses. Therefore, there are many cases that an endianness dependent program is written while assuming that it is executed by a processor based on specific endianness.

There have been reported some techniques for supporting portability of software to a processor based on different endianness. For example, Japanese Patent Application National Publication No. 2008-523514 discloses a compiling technique for correcting endianness dependent processing by automatically inserting a byte swap command. This technique adopts a policy of finding an assignment statement having incoherent endianness based on endianness information attached to a variable by an operator. As a problem of this technique, an operator who attempts porting software must have sufficient knowledge about the configuration and behavior of the software to be ported. Meanwhile, Japanese Patent Application Laid-Open No. H05-119960 discloses a technique for pointing an endianness dependent part based on a source code of software. According to this technique, a graph structure is created for an assignment relationship of variables of a program to be checked, and it is determined that there can be endianness dependence at a position where a type conversion is performed before and after assignment. In this technique, because of the extraction of the type conversion, it is believed that the detection accuracy deteriorates considerably when endianness information is not attached to a variable.

BRIEF SUMMARY OF THE INVENTION

A source code analyzing system according to an embodiment of the present invention comprises:

a first building unit that builds a source code to generate a first object code that operates in an execution environment according to a first variable memory system;

a first executing unit that executes an execution-trace outputting process in which the first object code is operated to sequentially acquire values assigned to an assignment statement on an execution path of the first object code, and association between the acquired value and the assignment statement is sequentially output as an execution trace;

a second building unit that builds the source code to generate a second object code that operates in an execution environment according to a second variable memory system, which is different from the first variable memory system; and a second executing unit that executes a dependent-part specifying process in which the second object code is operated to acquire a value assigned to an assignment statement on an execution path of the second object code during execution of the second object code, every time a value is assigned, it is determined whether the acquired value assigned to the assignment statement during execution of the second object code matches an expected value, which is a value obtained based on the execution trace and assigned to the assignment statement on the execution path of the second object code, and when both of the values are different from each other, the value assigned during execution of the second object code is overwritten by the expected value, to output a report of position information of the assignment statement in the source code, indicating that the assignment statement in which the assigned value is overwritten by the expected value is a part dependent on a variable memory system.

A source code analyzing method according to an embodiment of the present invention comprises:

generating a first object code that operates in an execution environment according to a first variable memory system by building a source code;

performing an execution-trace outputting process in which the first object code is operated to sequentially acquire values assigned to an assignment statement on an execution path of the first object code, and association between the acquired value and the assignment statement is sequentially output as an execution trace;

generating a second object code that operates in an execution environment according to a second variable memory system, which is different from the first variable memory system, by building the source code; and performing a dependent-part specifying process in which the second object code is operated to acquire a value assigned to an assignment statement on an execution path of the second object code during execution of the second object code, every time a value is assigned, determining whether the acquired value assigned to the assignment statement during execution of the second object code matches an expected value, which is a value obtained based on the execution trace and assigned to the assignment statement on the execution path of the second object code, and when both values are different from each other, overwriting the value assigned during execution of the second object code by the expected value and outputting a report of position information of the assignment statement in the source code, indicating that the assignment statement in which the assigned value is overwritten by the expected value is a part dependent on a variable memory system.

BRIEF DESCRIPTION OF THE DRAWINGS

FIG. 2 is a diagram for explaining an example of an execution trace;

FIG. 3 is a flowchart for explaining an outline of an endianness porting operation according to the first embodiment;

FIG. 4 is a flowchart for explaining a source-code converting process;

FIGS. 5A to 5C are diagrams for explaining an implementation example of a _assign_hook function and an example of a source cord before and after inserting the _assign_hook function;

FIG. 7 is a flowchart for explaining an execution-trace outputting process;

FIG. 8 is a flowchart for explaining an endianness-dependent-part specifying process;

FIG. 9 is a diagram for explaining an example of a source code as a specifying target of an endianness dependent part;

FIG. 10 is a diagram for explaining of a simulation result;

FIG. 11 is an example of an endianness-dependent part report;

FIG. 12 is a diagram for explaining a simulation result;

FIG. 13 is a diagram for explaining an example of a hardware configuration of the source code analyzing system;

FIG. 16 is a flowchart for explaining an endianness-dependent part specifying process.

DETAILED DESCRIPTION OF THE INVENTION

According to the methods described in Japanese Patent Application National Publication No. 2008-523514 and Japanese Patent Application Laid-Open No. H05-119960, estimation of an endianness dependent part is performed statically based on type information on the source code of the software. On the other hand, in general programming, variables can be operated by ignoring the type, and thus malfunction and false detection of the method tend to occur. Particularly, in programming of an assembly field or a device driver, a special technique can be used due to reduction of memory usage, reduction of a processing time, and restriction of an accessing procedure to hardware.

There can be considered a method of specifying a position where a problem occurs by actually executing the software, with respect to the two techniques for assuming the dependent position based on the information statically acquired from the source code. Such a method is simple and easy to implement. According to the method of actually executing the software, the endianness dependent part can be sequentially removed by repeating correction and test. However, the present inventor has found that the endianness dependent part that can be reliably found by one simulation is only one at most, and its work efficiency is low.

Exemplary embodiments of a source code analyzing system and a source code analyzing method according to the present invention will be explained below in detail with reference to the accompanying drawings. The present invention is not limited to the following embodiments.

Figure 1:
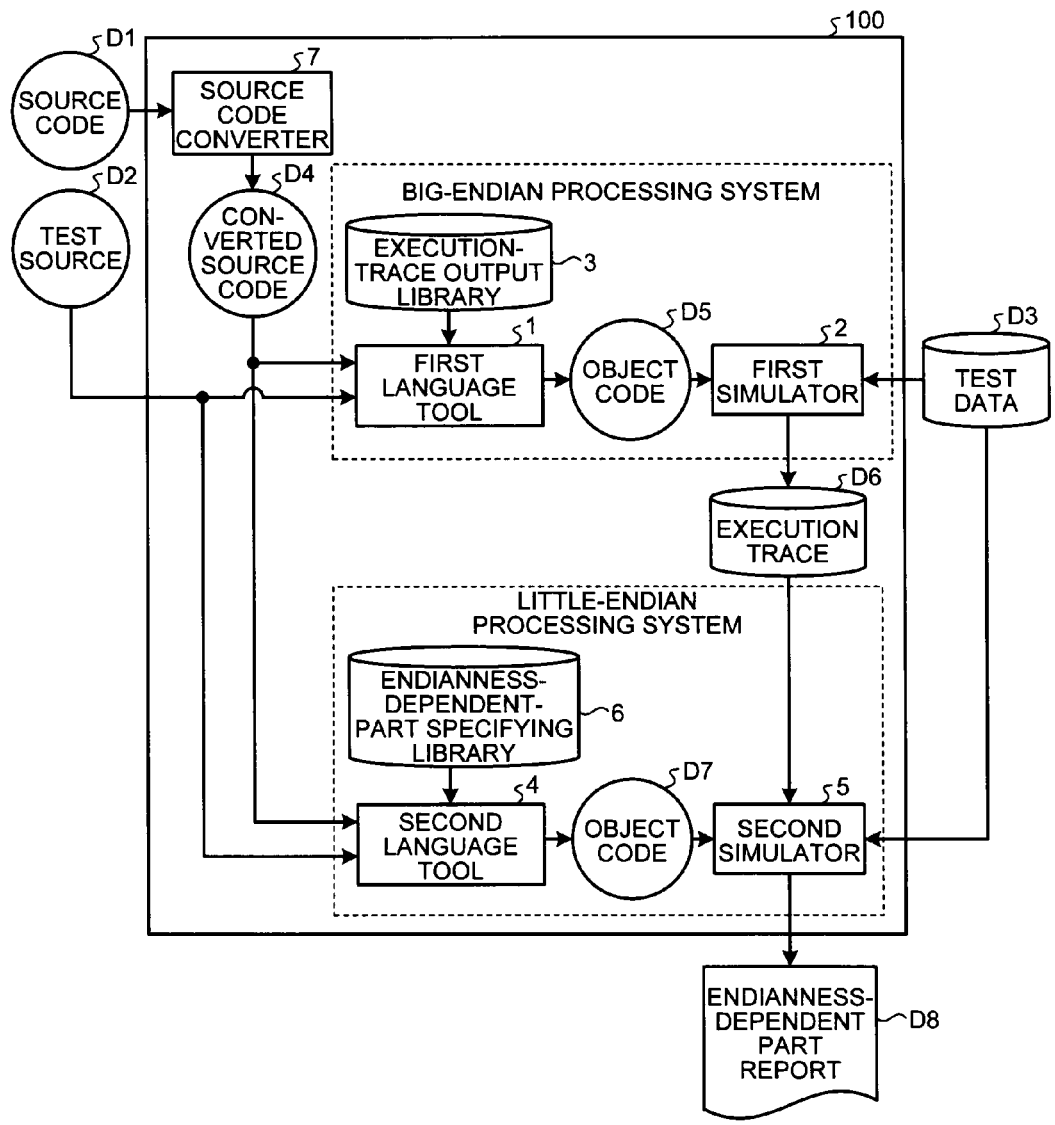
FIG. 1 is a diagram for explaining a configuration of a source code analyzing system according to a first embodiment of the present invention.

A source code analyzing system according to a first embodiment of the present invention can specify an endianness dependent part in a source code, which becomes a problem when a source code assumed to be executed in an execution environment according to a first endian system is ported to a source code assumed to be executed in an execution environment according to a second endian system. The big endian is explained as a first endian, and the little endian is explained as a second endian hereinafter. In the following explanations, an element (constituent element, data) according to the big-endian system may be simply expressed as big-endian processing system. Further, an element (constituent element, data) according to the little-endian system may be simply expressed as little-endian processing system. FIG. 1 is a diagram for explaining a configuration of the source code analyzing system according to the first embodiment.

A source code analyzing system 100 includes, as shown in FIG. 1, a first language tool 1 (first building unit), a first simulator 2 (first executing unit), an execution-trace output library 3, a second language tool 4 (second building unit), a second simulator 5 (second executing unit), an endianness-dependent-part specifying library 6, and a source code converter 7.

When building and executing a source code D1 to be ported, which is described in the first endian (here, big endian), according to the second endian (here, little endian) method, the source code analyzing system 100 according to the first embodiment verifies whether a value interpreted to have the same meaning as a value intended for an assignment statement of the source code D1 (in other words, a value to be assigned when the source code D1 is built and executed according to the first endian system (assignment value)) is input, to thereby specify the endianness dependent part. As a configuration therefor, the source code analyzing system 100 includes a constituent element that performs processing according to the big-endian system (big-endian processing system) and a constituent element that performs processing according to the little-endian system (little-endian processing system). The first language tool 1, the first simulator 2, and the execution-trace output library 3 belong to the big-endian processing system, and the second language tool 4, the second simulator 5, and the endianness-dependent-part specifying library 6 belong to the little-endian processing system.

The source code converter 7 inserts processing for calling up the execution-trace output library 3 and the endianness-dependent-part specifying library 6 into all the assignment statements on the source code D1, and outputs a converted source code D4.

The first language tool 1 builds the source code to generate an object code that operates in an execution environment according to the big-endian system. When a test source D2 that provides peripheral processes for operating the source code D1 and the converted source code D4 are input to the first language tool 1, the first language tool 1 combines the input test source D2 and the converted source code D4 to build and generate an object code D5 (a first object code). A generally available group of tools including a compiler, an assembler, a linker, and a standard library can be used for the first language tool 1.

The execution-trace output library 3 is called up and referred to at the time of building the converted source code D4 in the first language tool 1.

The first simulator 2 is an execution environment for interpreting and executing (simulating) the object code based on the big-endian system. In other words, the first simulator 2 is the execution environment according to the big-endian system. The execution environment is a computer environment including, for example, a processor, a memory, and peripheral devices. An actual machine in the big-endian processing system can be used for the first simulator 2; however, a virtual environment simulating an actual machine in the big-endian processing system realized on a computer is used here for explanation.

The first simulator 2 executes (operates) the object code D5 using test data D3, which is a test pattern for verifying an operation of the source code D1. At the time of executing the object code D5, the first simulator 2 sequentially acquires a value assigned to an assignment statement (an assignment value) appearing in an execution path when the source code D1 is built and executed according to the big-endian system, based on control by the execution-trace output library 3 incorporated in the object code D5, and sequentially outputs association between the assignment value and the assignment statement, to which an assignment value is assigned, as an execution trace D6. It is assumed here that the assignment value and a position of the assignment statement, to which an assignment value is assigned, on the source code D1 are associated with each other in the execution trace D6. In the explanations of the processing performed by the first simulator 2 controlled by the execution-trace output library 3, which is incorporated in the object code D5, the execution-trace output library 3 can be expressed as an operational main body of the processing.

FIG. 2 is a diagram for explaining an example of the execution trace D6. As shown in FIG. 2, a position of the executed assignment statement on the source code D1 and the assignment value are associated with each other and described in the execution trace D6 in a time-series order. A file name and a line number are used here as a notation system indicating the position on the source code D1; however, another notation system can be used so long as the position on the source code D1 can be specified by an operator. Other types of identification information can be used instead of the position of the executed assignment statement on the source code D1, so long as it can identify the assignment statement on the source code D1.

The second language tool 4 builds a source code to generate an object code that operates in an execution environment according to the little-endian system. The second language tool 4 has the same function as that of the first language tool 1 except of a difference of the endianness. When the test source D2 and the converted source code D4 are input, the second language tool 4 combines the input test source D2 and the converted source code D4 to build and generate an object code D7 (a second object code).

The endianness-dependent-part specifying library 6 is referred to, when the converted source code D4 is built by the second language tool 4.

The second simulator 5 is an execution environment for interpreting and executing the object code based on the little-endian system. The second simulator 5 has the same function as that of the first simulator 2 except of a difference of the endianness. The second simulator 5 executes the object code D7 using the test data D3.

At the time of executing the object code D7, the second simulator 5 reads the execution trace D6 based on the control by the endianness-dependent-part specifying library 6 incorporated in the object code, and acquires an expected value, which is a value to be assigned to an assignment statement, based on the execution trace D6, every time an assignment value is assigned to the assignment statement in the execution path of the object code D7, to compare the assignment value actually assigned to the assignment statement during execution of the object code D7 with the acquired expected value. When a difference between the assignment value and the expected value is found, the endianness-dependent-part specifying library 6 outputs an endianness-dependent part report D8 by assuming that the endianness dependent part has been found. In the explanations of the processing performed the first simulator 2 controlled by the endianness-dependent-part specifying library 6, which is incorporated in the object code D7, the endianness-dependent-part specifying library 6 can be expressed as an operational main body of the processing.

When a value different from an intended value (an expected value) is assigned to the assignment statement during execution of the object code D7, data error is propagated, and processing after the assignment statement becomes different from the intended one. Even in the case of the assignment statement having no endianness dependence, it may be detected as the endianness dependent part. Therefore, to prevent transmission of the data error, the endianness-dependent-part specifying library 6 incorporated in the object code D7 overwrites the assignment value by the expected value, every time a difference between the assignment value in the assignment statement in the object code D7 and the expected value is found. Because the object code D7 is executed while the endianness-dependent assignment value is sequentially replaced by the expected value, even if there are a plurality of endianness dependent parts in the execution path, the source code analyzing system 100 can specify the endianness dependent parts in the execution path by one simulation.

A method for specifying the endianness dependent part using the source code analyzing system 100 according to the first embodiment is explained next. It is assumed here for the explanation that the endianness dependent part is specified as part of an operation for porting the source code D1 described in C language from the big-endian system to the little-endian system.

FIG. 3 is a flowchart for explaining an outline of an endianness porting operation performed by the source code analyzing system 100 according to the first embodiment. The source code converter 7 performs syntactic analysis with respect to the source code D1, and performs a source-code converting process, which is a process for inserting a _assign_ hook function, which is a function for calling up and executing a library (the execution-trace output library 3 and the endianness-dependent-part specifying library 6) (Step S1). The _assign_hook function is linked to the execution-trace output library 3 when being built by the first language tool 1, and is linked to the endianness-dependent-part specifying library 6 when being built by the second language tool 4. FIG. 4 is a flowchart for explaining the source-code converting process.

As shown in FIG. 4, the source code converter 7 first selects one assignment statement included in the source code D1 (Step S11), and determines whether the type of left-hand side expression is a value type with respect to the one assignment statement (Step S12). A value or variable of the value type indicates that the content itself of the value or variable has a meaning. On the other hand, a value or variable of a reference type indicates another variable and the content itself of the value or variable has no meaning. In C language, a pointer type corresponds to the reference type.

The source code converter 7 does not insert the _assign_ hook function into an assignment statement with respect to a reference type variable. Because the value of the reference type can change according to a condition at the time of building or executing, useful information cannot be acquired even if a comparison is performed. At Step S12, when the type of the left-hand side expression is not the value type but is the reference type (NO at Step S12), control proceeds to Step S17.

When the type of the left-hand side expression is the value type (YES at Step S12), the source code converter 7 further determines whether the left-hand side expression is a structure for storing a plurality of values (Step S13).

All the values stored in the structure are not always the same type. When the left-hand side expression is a structure (YES at Step S13), the source code converter 7 recursively scans respective elements constituting the structure, to create a type list indicating the type of the respective constituent elements (Step S14). The source code converter 7 inserts the _assign_hook function into the assignment statement currently selected (Step S15).

When the type of left-hand side expression is not a structure (NO at Step S13), the source code converter 7 describes the type of the left-hand side expression in the type list including one constituent element (Step S16), and control proceeds to Step S15.

After finishing Step S15, the source code converter 7 determines whether all the assignment statements have been selected (Step S17). When there is an unselected assignment statement (NO at Step S17), the control proceeds to Step S11, where the source code converter 7 selects one assignment statement of the unselected assignment statements. When all the assignment statements have been selected (YES at Step S17), the source code converter 7 finishes the source-code converting process.

FIG. 5A is a diagram for explaining an implementation example of the _assign_hook function. The _assign_hook function shown in FIG. 5A is indicated by a pseudo-code. The _ assign_hook function receives a left-hand-value reference address, which is a storage address of the left-hand value of the assignment statement, a position of the assignment statement in the source code (a position of the assignment statement), a total number of bytes of the assignment value (the total number of bytes assigned), and a list of elements constituting the type of the left-hand value of the assignment statement (the type list) as arguments. FIG. 5B depicts a source code [sample.c] as an example of the source code D1. In the sixth line of sample.c, there is an assignment statement having a left-hand value [*pa], to which one value of the value type is assigned. FIG. 5C depicts a source code of [sample_hooked.c] as the converted source code D4 in which the _assign_hook function is inserted into the source code [sample.c] shown in FIG. 5B. The _assign_hook function inserted into the sixth line of sample_hooked.c receives [&(*pa)] as the left-hand-value reference address, [sixth] line in file name [sample.c] as the position of the assignment statement, [4] as the total number of bytes of the assignment value, and [T_INT32] indicating a value of an integer type of one 4-bytes (32 bits) as the type list.

Figures 6A, 6B:
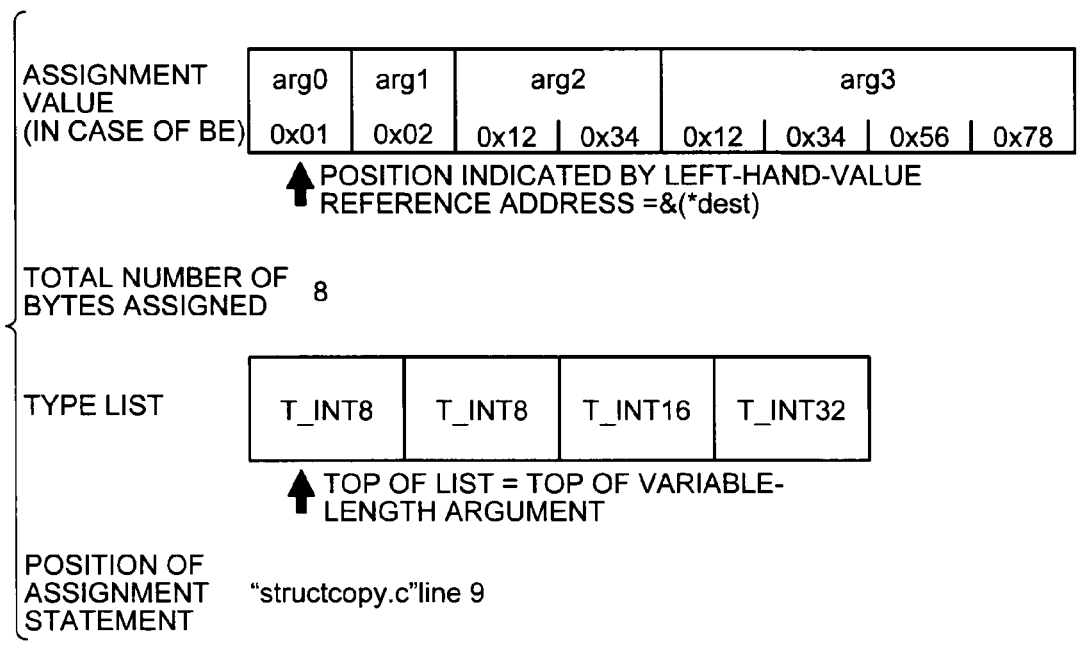
FIGS. 6A and 6B are diagrams for explaining an example of a composite-type structure.

FIG. 6A depicts a source code [structcopy.c] as an example of the source code D1 including a composite-type structure. A composite-type structure [st_sample] is defined in which values [arg0] and [arg1] of char type, a value [arg2] of short type, and a value [arg3] of long type are stored in this order. A variable [src] of [st_sample] type is declared in the seventh line with initial values [0x01], [0x02], [0x1234], and [0x12345678]. Further, in the ninth line is described an assignment statement for assigning a value of the variable [src] to a variable [*dest] of [st_sample] type stored at an address indicated by a pointer [dest].

FIG. 6B is a conceptual diagram for explaining an argument received by the _assign_hook function inserted into the ninth line of a source code [structcopy.c] shown in FIG. 6A. 8-byte values in total of [arg0], [arg1], [arg2], and [arg3] are stored in this order from a top address in a memory area, in which address [&(*dest)] is designated as a top address. The _assign_hook function receives [&(*dest)] as the left-hand-value reference address, [8] as the total number of bytes, and ["structcopy.c" line 9] as the position of the statement. Because the value [arg0] of char type, value [arg1] of char type, value [arg2] of short type, and value [arg3] of long type are stored, designating the address [&(*dest)] as the top address, the _assign_hook function receives character strings of [T_INT8], [T_INT8], [T_INT16], and [T_INT32] in this order as variable-length arguments.

Note that, according to the assignment statement on the ninth line, [0x01], [0x02], [0x1234], and [0x12345678] are respectively assigned to [arg0], [arg1], [arg2], and [arg3]. According to the big-endian system, assignment value 0x1234 to [arg2] is stored in the memory area for storing [arg2] in order of 0x12 and 0x34 from the top address. Further, assignment value 0x12345678 to [arg3] is stored in the memory area for storing [arg3] in order of 0x12, 0x34, 0x56, and 0x78 from the top address.

In this way, the source code converter 7 inserts the _assign_hook function into the assignment statement in which the type of the left-hand side expression is the value type, included in the source code D1.

After the source-code converting process at Step S1, the first language tool 1 executes building of the converted source code D4 (Step S2), to generate the object code D5. At this time, the first language tool 1 links the execution-trace output library 3 to the _assign_hook function inserted into the converted source code D4.

Subsequently, the first simulator 2 interprets the object code D5 according to the big-endian system and performs a big-endian simulating process. At this time, when an executed portion reaches the assignment statement into which the _assign_hook function is inserted, an execution-trace outputting process for outputting the execution trace D6 is performed by the execution-trace output library 3 incorporated in the object code D5 (Step S3).

FIG. 7 is a flowchart for explaining the execution-trace outputting process. When the executed portion reaches the assignment statement into which the _assign_hook function is inserted, the execution-trace output library 3 writes a position of the statement (file name and line number) to be received as an argument in a blank entry of the execution trace D6 (Step S31). The execution-trace output library 3 extracts one constituent element (hereinafter, "element") from the type list (Step S32), to acquire a byte width of a value corresponding to the extracted element (Step S33). When it is assumed that the acquired byte width is Nb bytes, the execution-trace output library 3 reads Nb-byte data from the left-hand-value reference address, brings the left-hand-value reference address forward by Nb bytes, and subtracts Nb bytes from the total number of bytes assigned (Step S34). The execution-trace output library 3 converts the read data to an endianness (recording endianness) predetermined for recording in the execution trace D6, and writes a converted value in the execution trace D6 as an assignment value (Step S35). The recording endianness can be any endianness. The execution-trace output library 3 determines whether the total number of bytes assigned exceeds zero (total number of bytes >0) (Step S36). When the total number of bytes assigned exceeds zero (YES at Step S36), because there is an unacquired element of the elements constituting the structure, control proceeds to Step S32. When the total number of bytes assigned does not exceed zero, that is, is equal to zero (NO at Step S36), control returns.

Thus, the first simulator 2 outputs the execution trace D6, in which the assignment value assigned to the assignment statement included in the source code D1 is recorded in association with the position of the assignment statement on the source code D1 during an operation of the object code D5, based on the execution-trace output library 3 incorporated in the object code D5.

Subsequent to Step S3, the second language tool 4 performs building of the converted source code D4 (Step S4), to generate the object code D7. At this time, the second language tool 4 links the endianness-dependent-part specifying library 6 to the _assign_hook function inserted into the converted source code D4.

The second language tool 4 performs a little-endian simulating process in which the object code D7 is interpreted and executed according to the little-endian system (Step S5). At this time, when the executed portion reaches the assignment statement into which the _assign_hook function is inserted, the endianness-dependent-part specifying library 6 incorporated in the object code D7 performs an endianness-dependent-part specifying process for checking whether the assignment statement is an endianness dependent part.

FIG. 8 is a flowchart for explaining the endianness-dependent-part specifying process. First, the endianness-dependent-part specifying library 6 reads one entry from the execution trace D6 (Step S51), and compares a position of the assignment statement described in the read entry with a position of the assignment statement received as the argument of the _assign_hook function, to determine whether the positions match each other (Step S52).

Association (entry) between the position of the assignment statement and the assignment value assigned to the assignment statement is described in the execution trace D6, in order of appearance in the execution path during execution according to the big-endian processing system. So long as taking the same execution path as the big-endian simulating process, the assignment statement into which the _assign_hook function is inserted appears in the execution path at the time of performing the little-endian simulating process in the same order as the order of entries described in the execution trace D6. At Step S51, therefore, an entry described next to an entry read last time needs only to be read. When both positions do not match each other at Step S52 (NO at Step S52), the endianness-dependent-part specifying library 6 issues a warning that the same execution path is not taken at the time of performing the big-endian simulating process and at the time of performing the little-endian simulating process (Step S53), to finish the little-endian simulating process. As a cause of not taking the same execution path at the time of performing the big-endian simulating process and at the time of performing the little-endian simulating process, it can be considered that the endianness dependent part has been overlooked before performing the endianness-dependent-part specifying process.

At Step S52, when the positions of both assignment statements match each other (YES at Step S52), the endianness-dependent-part specifying library 6 extracts one element from the type list received as the argument of the _assign_hook function (Step S54), to acquire a byte width of a value corresponding to the extracted type list (Step S55). It is assumed here that the acquired byte width is Nb bytes. The endianness-dependent-part specifying library 6 reads Nb-byte data from the left-hand-value reference address as an assignment value (Step S56).

Subsequently, the endianness-dependent-part specifying library 6 reads Nb-byte data described in the recording endianness from the entry read at Step S51, to obtain an expected value by converting the read data to the little-endian system (Step S57).

The endianness-dependent-part specifying library 6 then determines whether the type of the assignment value read at Step S56 is the reference type based on the type list acquired at Step S54 (Step S58). When the type of the assignment value is not the reference type (NO at Step S58), the endianness-dependent-part specifying library 6 compares the assignment value read at Step S56 with the expected value obtained at Step S57 to determine whether both values match each other (Step S59). When the both values do not match each other (NO at Step S59), the endianness-dependent-part specifying library 6 recognizes that the assignment statement is an endianness dependent part, and writes the position of the assignment statement on the source code, the expected value, and the assignment value in the endiannness-dependent part report D8 (Step S60). Further, the endianness-dependent-part specifying library 6 overwrites the assignment value stored in the left-hand-value reference address by the expected value (Step S61), increments the left-hand-value reference address by Nb bytes, and decrements the total number of bytes assigned by Nb bytes (Step S62).

When the type of the assignment value is the reference type (YES at Step S58), control proceeds to Step S62. Further, when the assignment value read at Step S56 matches the expected value obtained at Step S57 (YES at Step S59), control proceeds to Step S62.

After Step S62, the endianness-dependent-part specifying library 6 determines whether the total number of bytes assigned exceeds zero (Step S63). When the total number of bytes assigned exceeds zero (YES at Step S63), because there is an unacquired element of the elements constituting the structure, control proceeds to Step S54. When the total number of bytes assigned does not exceed zero, that is, is equal to zero (NO at Step S63), control returns.

In this way, the second simulator 5 reads a value associated with the assignment statement, to which a value is assigned, from the execution trace D6, every time a value is assigned to the assignment statement on the execution path in the object code D7, based on the endianness-dependent-part specifying library 6, calculates an expected value based on the read value, and determines whether the assignment value matches the calculated expected value. When both values are different from each other, the second simulator 5 overwrites the assignment value by the expected value, and outputs a report of the position of the assignment statement in the source code D1, regarding that the assignment statement is the endianness dependent part.

According to the operation at Steps S1 to S5, all of one or more endianness dependent parts included in the execution path are specified. After Step S5, an operator determines whether an endianness dependent part has been found (Step S6). When the endianness dependent part has been found (YES at Step S6), the operator corrects the endianness dependent part (Step S7), and executes the operation at Step S1 and thereafter again using the source code analyzing system 100 to verify whether there is no endianness dependent part. When any endianness dependent part has not been found (NO at Step S6), porting of the source code D1 to the little-endian system is compete, to finish the operation.

According to the operation at Steps S1 to S5, only the endianness dependent part included in the execution path taken can be specified. To broaden a specifying target of the endianness dependent part on the source code D1, the test data D3 can be selected so that coverage is increased. Alternatively, the operation at Steps S1 to S5 can be executed using the test data D3 of a plurality of patterns. By using a plurality of test data D3, patterns of the execution path increase, thereby enabling to broaden the specifying target of the endianness dependent part.

A state where a plurality of endianness dependent parts are specified is explained next with a specific example. FIG. 9 is an example of the source code D1 as a specifying target of the endianness dependent part. As shown in FIG. 9, it is assumed that a byte sequence such as {0x00, 0x10} is prestored at an address indicated by pointer [buffer], and the value stored at the address indicated by the pointer [buffer] is assigned to [temp] in the fourth line. A value obtained by dividing the value of [temp] by 2 is assigned to [temp2] in the sixth line. In the eighth to thirteenth lines, if a condition of [temp]being larger than [0xFF] is satisfied, [0x100] is added to [temp2]. If the condition is not satisfied, [0x100] is subtracted from [temp2].

FIG. 10 is a diagram for explaining of a simulation result according to the first embodiment. As shown in FIG. 10, in the fourth line, while the expected value in the big-endian system is [0x0010], the assignment value in the little-endian system is [0x1000], and it is determined that there is dependence. When there is dependence, the assignment value [0x1000] in the fourth line is overwritten by the expected value [0x0010] to continue the little-endian simulating process. Accordingly, both of the expected value and the assignment value become [0x0008] in the sixth line, and it is determined that there is no dependence in the sixth line. Branch condition determination for the eighth line is performed based on the correct assignment value of the sixth line, and the path for the ninth line is taken in both parts of endianness. In the ninth line, [0x100] is added to the correct assignment value of the sixth line, and both of the expected value and the assignment value become [0x0108], and it is determined that the assignment statement in the ninth line has no dependence.

FIG. 11 is an example of the endianness-dependent part report D8. As shown in FIG. 11, the fourth line is specified as the endianness dependent part.

Subsequently, a case that Step S5 is performed without performing overwrite by the expected value shown at Step S61 is considered. FIG. 12 is a diagram for explaining a simulation result in this case. As shown in FIG. 12, in the fourth line, the expected value in the big-endian system becomes [0x0010], the assignment value in the little-endian system becomes [0x1000], and it is determined that there is dependence. Further, a data error in the fourth line is propagated, and thus the expected value becomes [0x0008] and the assignment value becomes [0x0800]in the sixth line, and it is determined that there is dependence. In the big-endian system, the branch condition determination shown in the eighth line is performed based on the assignment value in the sixth line, and the ninth line becomes an execution path. On the other hand, in the little-endian system, the branch condition determination is performed based on error data [0x1000], and a path of the twelfth line is taken instead of the ninth line. Because the execution path is different between the big-endian system and the little-endian system, a warning is issued and the simulation is finished. Thus, the data error in the fourth line is propagated to the subsequent process, and it cannot be correctly determined whether there is the endianness dependence in and after the fifth line. On the other hand, in the first embodiment, when an endianness dependent part is found, because the assignment value is overwritten to perform the subsequent process, transmission of data error can be prevented. Accordingly, even if there is an endianness dependent process, detection of the endianness dependence part can be continued in the subsequent process. That is, because a plurality of endianness dependent parts can be specified by one execution, the endianness dependent part can be efficiently specified.

The source code analyzing system 100 explained above can be realized by a general computer. FIG. 13 is a diagram for explaining an example of a hardware configuration of the source code analyzing system 100. The source code analyzing system 100 has a computer configuration including a central processing unit (CPU) 11, a read only memory (ROM) 12, a random access memory (RAM) 13, a display unit 14, and an input unit 15. The CPU 11, the ROM 12, the RAM 13, the display unit 14, and the input unit 15 are respectively connected with each other via a bus line.

The CPU 11 executes a source-code analyzing program 16, which is a computer program for specifying the endianness dependent part of the source code. The display unit 14 is a display device such as a liquid crystal monitor, and displays output information to a user such as an operation screen or the like based on an instruction from the CPU 11. The input in it 15 includes a mouse and a keyboard, to input an operation of the source code analyzing system 100 from the user. The operation information input to the input unit 15 is transmitted to the CPU 11.

The source-code analyzing program 16 is stored in the ROM 12, and is loaded to the RAM 13 via the bus line. The CPU 11 executes the source-code analyzing program loaded into the RAM 13. Specifically, in the source code analyzing system 100, the CPU 11 reads the source-code analyzing program 16 from the ROM 12 and develops the source-code analyzing program 16 in a program storage area of the RAM 13 to perform various types of processes, according to an instruction input from the input unit 15 by a designer. The source code D1, the test source D2, and the test data D3 are input from an external memory or the like. The CPU 11 performs various types of processes based on the source code D1, the test source D2, the test data D3 input from the external memory or the like, and temporarily stores data such as the converted source code D4, the object code D5, the execution trace D6, and the object code D7 generated at the time of performing the various types of processes in the data storage area formed in the RAM 13. The CPU 11 outputs the created endianness-dependent part report D8 to the program storage area in the RAM 13 or to the external memory. The source-code analyzing program can be stored in a memory such as a disk. The source-code analyzing program 16 can be loaded to a memory such as a disk.

The source-code analyzing program 16 according to the first embodiment includes the respective units described above (the first language tool 1, the first simulator 2, the execution-trace output library 3, the second language tool 4, the second simulator 5, the endianness-dependent-part specifying library 6, and the source code converter 7). The respective units are loaded onto a main memory, to form the first language tool 1, the first simulator 2, the execution-trace output library 3, the second language tool 4, the second simulator 5, the endianness-dependent-part specifying library 6, and the source code converter 7 on the main memory. The execution-trace output library 3 and the endianness-dependent-part specifying library 6 can be loaded onto the external memory.

The first language tool 1, the first simulator 2, the second language tool 4, and the second simulator 5 can be realized by executing a generally used tool or program. Accordingly, the source-code analyzing program 16 including the execution-trace output library 3, the endianness-dependent-part specifying library 6, and the source code converter 7 can be provided.

Further, the first language tool 1, the first simulator 2, the execution-trace output library 3, the second language tool 4, the second simulator 5, the endianness-dependent-part specifying library 6, and the source code converter 7 can be realized by a plurality of computers. For example, an actual computer that executes the object code according to both parts of endianness can be used as the first simulator 2 and the second simulator 5. When an actual computer is used as the first simulator 2 and the second simulator 5, the source-code analyzing program 16 including the first language tool 1, the execution-trace output library 3, the second language tool 4, the endianness-dependent-part specifying library 6, and the source code converter 7 can be executed so that the source code analyzing system 100 according to the first embodiment is realized by a computer as a host device in which the first language tool 1, the execution-trace output library 3, the second language tool 4, and the endianness-dependent-part specifying library 6 are generated on the main memory, and an actual computer as a slave device that functions as the first simulator 2 and the second simulator 5. Transfer of various pieces of data between the host and the slave device is performed via a network or a detachable external memory.

The source-code analyzing program 16 can be stored on a computer connected to a network such as the Internet and provided by downloading the source-code analyzing program 16 via the network. Further, the source-code analyzing program 16 can be provided or distributed via a network such as the Internet. The source-code analyzing program 16 can be provided to the source code analyzing system 100 by incorporating the source-code analyzing program 16 in a ROM or the like beforehand.

In the above explanations, the source code converter 7 inserts the same _assign_hook function as a function for linking the execution-trace output library 3 to the first language tool 1 and a function for linking the endianness-dependent-part specifying library 6 to the second language tool 4. However, the function for linking the execution-trace output library 3 to the first language tool 1 and the function for linking the endianness-dependent-part specifying library 6 to the second language tool 4 can be different.

The execution-trace output library 3 and the endianness-dependent-part specifying library 6 are linked at the time of building; however, these can be linked at the time of executing the object code. When these are linked at the time of executing the object code, the first simulator 2 and the second simulator 5 can be constituted accessibly to the execution-trace output library 3 and the endianness-dependent-part specifying library 6, respectively, at the time of execution.

An example of the source code D1 described in C language is explained above. However, the program language of the source code D1 can be a procedural language other than C language. Further, the big endian is explained as the first endian, and the little endian is explained as the second endian; however, the combination of the first endian and the second endian is not limited to this combination, and the first embodiment can be applied to any combination of the endianness.

As described above, according to the first embodiment, every time an assignment statement is executed during performing a simulation according to the second endian system, it is determined whether a value interpreted to have the same meaning is assigned to the assignment statement in the simulation according to the first endian system and the simulation according to the second endian system. When the value interpreted to have the same meaning is not assigned, a value assigned according to the second endian system is overwritten by the expected value, and the assignment statement is output as a report of the endianness dependent part. Accordingly, even in or after the processing of the endianness dependent part, other endianness dependent parts can be specified correctly, and a plurality of endianness dependent parts can be specified by one execution. That is, the endianness dependent part included in the source code can be efficiently specified. Because an input of the endianness by an operator is not required, the endianness dependent part included in the source code can be specified without any previous knowledge of the source code.

When porting from the big-endian system to the little-endian system is performed by the first embodiment, all pieces of data written by the object code generated from the ported source code in the memory become the little-endian system. In this case, a problem occurs when a library that communicates with a hardware accelerator connected via a memory map I/O or other processing systems is reused by the big-endian processing system.

Figure 14:
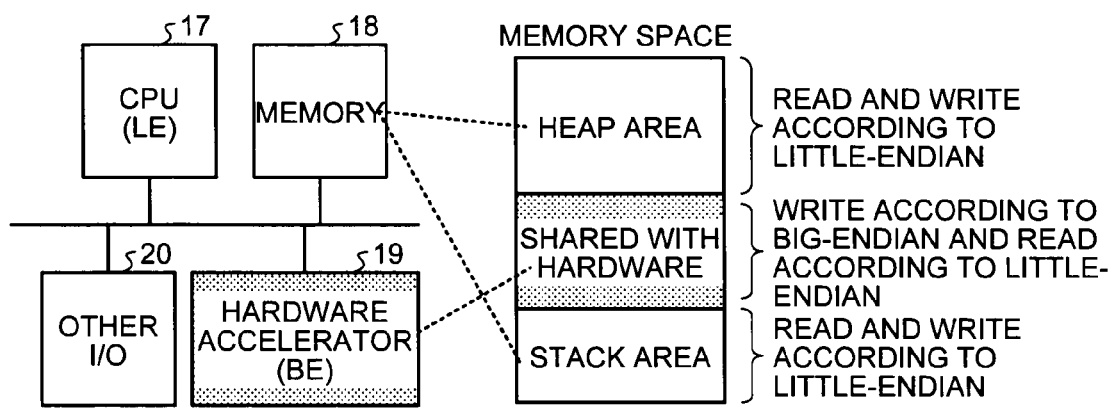
FIG. 14 is a diagram for explaining an example of a target system.

For example, like a target system shown in FIG. 14, in a system in which a CPU 17 of the little-endian (LE) processing system, a memory 18, a hardware accelerator 19 of the big-endian processing system, and an I/O 20 are connected via a bus, in a memory space, for example, there are a heap area and a stack area in which read and write are performed according to the little-endian system, and an area for communication between the hardware accelerator 19 and the CPU 17, written according to the big-endian system and read according to the little-endian system.

Figure 15:
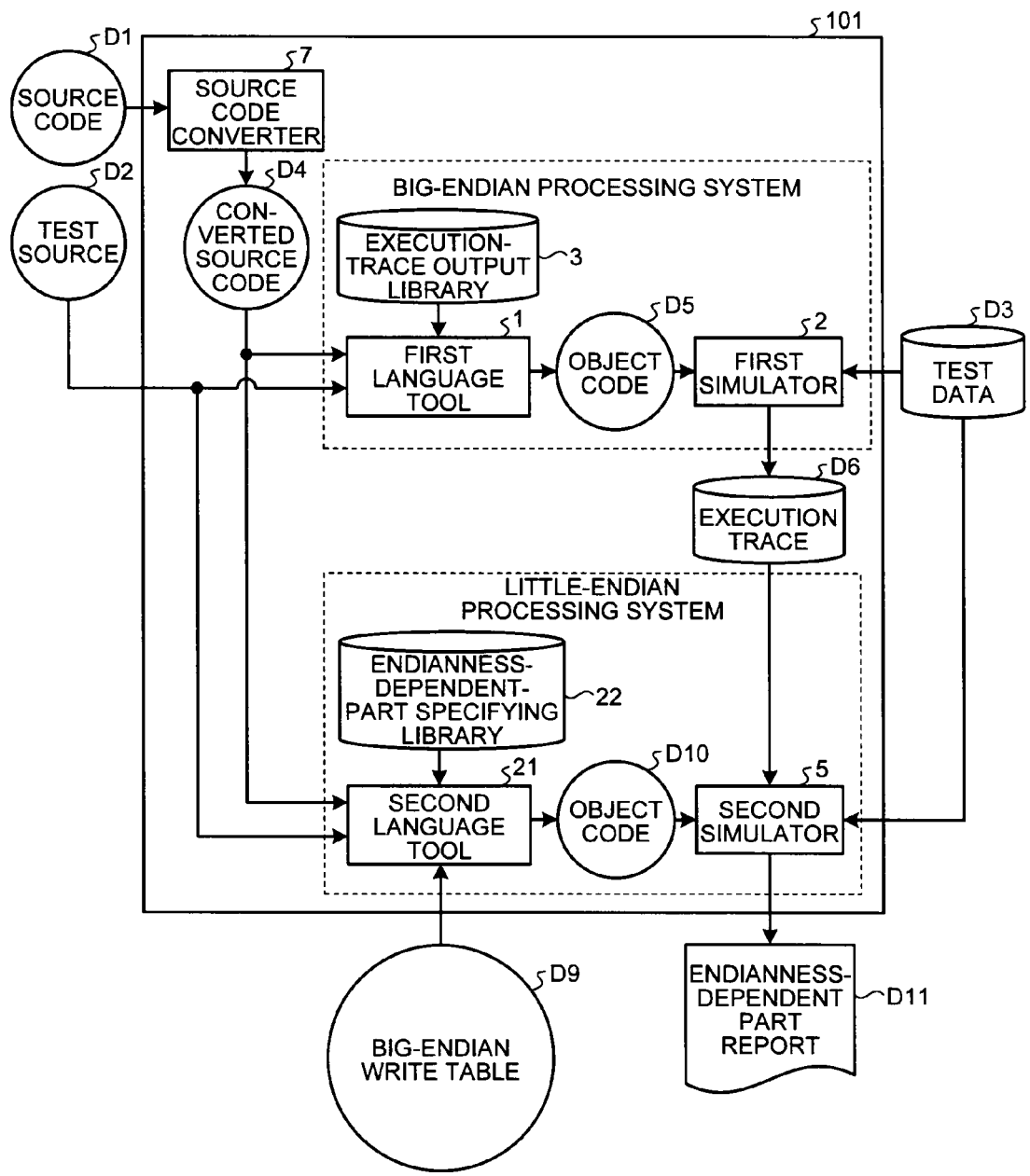
FIG. 15 is a diagram for explaining a configuration of a source code analyzing system according to a second embodiment of the present invention.

Therefore, in a second embodiment of the present invention, it is configured that a specific address range can be written according to a specific endianness. FIG. 15 is a diagram for explaining a configuration of a source code analyzing system according to the second embodiment. Constituent elements of the second embodiment having functions identical to those of the first embodiment are denoted by like reference numerals, and detailed explanations thereof will be omitted.

As shown in FIG. 15, a source code analyzing system 101 includes the first language tool 1, the first simulator 2, the execution-trace output library 3, a second language tool 21, the second simulator 5, an endianness-dependent-part specifying library 22, and the source code converter 7. Further, a big-endian write table D9, which is a table in which a range of an address to be written according to the big-endian system is described, is input to the source code analyzing system 101, other than the source code D1, the test source D2, and the test data D3.

The second language tool 21 combines the converted source code D4, the test source D2, and the big-endian write table D9 to build and create an object code D10. The second language tool 21 is linked to the endianness-dependent-part specifying library 22 at the time of building.

The second simulator 5 simulates the object code D10. At this time, an endianness-dependent part specifying process described below is performed by the endianness-dependent-part specifying library 22 incorporated in the object code D10. The endianness dependent part is output as an endianness-dependent part report D11.

FIG. 16 is a flowchart for explaining the endianness-dependent part specifying process. In FIG. 16, at Steps S71 to S76, the endianness-dependent-part specifying library 22 performs same processes as those at Steps S51 to S56. After Step S76, the endianness-dependent-part specifying library 22 reads Nb-byte data described according to the recording endianness from an entry of the execution trace D6 acquired at Step S71 and designates the data as a reference value (Step S77). The endianness-dependent-part specifying library 22 refers to the big-endian write table D9 incorporated in the object code D10 to determine whether the left-hand-value reference address is included in the address range to be written according to the big-endian system (Step S78).

When the left-hand-value reference address is included in the address range to be written according to the big-endian system (YES at Step S78), the endianness-dependent-part specifying library 22 converts the reference value from the recording endianness to the big endian and designates the value as an expected value (Step S80), to proceed to Step S81. When the left-hand-value reference address is not included in the address range to be written according to the big-endian system (NO at Step S78), the endianness-dependent-part specifying library 22 converts the reference value from the recording endianness to the little endian and designates the value as an expected value (Step S79), to proceed to Step S81.

The endianness-dependent-part specifying library 22 performs, at Steps S81 to S86, same processes as those at Steps S58 to S63.

In this way, the big-endian write table D9 for specifying the range of the memory address to be write-accessed according to the variable memory system of the big endian (first endian) (a memory-address range specification) is received. When the left-hand-value reference address is included in the range specified as the memory-address range specification, the value described according to the first endian is designated as the expected value. When the left-hand-value reference address is not included in the range specified as the memory-address range specification, the value described according to the little endian (second endian) is designated as the expected value. Accordingly, even if a target system includes a memory address area to be write-accessed according to a specific endian, the endianness dependent part can be specified correctly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A source code analyzing system comprising:
   a first execution environment that includes at least one processor and a memory;
   a second execution environment that includes at least one processor a memory;
   a first building unit that builds a source code to generate a first object code that executes in the first execution environment according to a first endian variable memory system;
   a first executing unit that executes an execution-trace outputting process in which the first object code is executed to sequentially acquire values assigned to an assignment statement on an execution path of the first object code, and association between the acquired value and the assignment statement is sequentially output as an execution trace;
   a second building unit that uses the source code to generate a second object code that executes in the second execution environment according to a second endian variable memory system, which is different from the first endian variable memory system; and
   a second executing unit that executes a dependent-part specifying process in which the second object code is executed to
      acquire a value assigned to an assignment statement on an execution path of the second object code during execution of the second object code,
      determine, every time a value is assigned, whether the acquired value assigned to the assignment statement during execution of the second object code matches an expected value, wherein the expected value is a value obtained based on the execution trace and assigned to the assignment statement on the execution path of the second object code,
      overwrite, when both of the values are different from each other, the value assigned during execution of the second object code by the expected value, and
      output a report of position information of the assignment statement in the source code, indicating that the assignment statement in which the assigned value during execution of the second object is overwritten by the expected value is a part dependent on an endian variable memory system.

2. The source code analyzing system according to claim 1, wherein
   the first building unit comprises a first library for executing the execution-trace outputting process, and links the first library to the source code at a time of building the source code, and
   the second building unit comprises a second library for executing the dependent-part specifying process, and links the second library to the source code at the time of building the source code.

3. The source code analyzing system according to claim 2, further comprising a source code converter that inserts a library calling function into an assignment statement included in the source code, wherein
   the first building unit links the first library to the library calling function inserted into the source code, and
   the second building unit links the second library to the library calling function inserted into the source code.

4. The source code analyzing system according to claim 1, wherein the expected value is a value obtained by describing a value assigned to the assignment statement on the execution path of the first object code described in the execution trace according to the second endian variable memory system.

5. The source code analyzing system according to claim 1, wherein the second executing unit receives an input of an address range specification for specifying a range of a memory address to be write-accessed according to the first endian variable memory system, and when a storage address of the value assigned to the assignment statement during execution of the second object code is included in a range specified by the address range specification, a value describing a value assigned to the assignment statement on the execution path of the first object code described in the execution trace according to the first endian variable memory system is designated as an expected value, and when the storage address of a value assigned to the assignment statement is not included in the range specified by the address range specification, a value describing a value assigned to the assignment statement on the execution path of the first object code described in the execution trace according to the second endian variable memory system is designated as an expected value.

6. The source code analyzing system according to claim 1, wherein the execution trace is information in which association between the acquired value assigned to the assignment statement on the execution path of the first object code and position information of the assignment statement in the source code is described in order of appearance on the execution path of the first object code, and the second executing unit reads one of the association in order of description in the execution trace, every time a value is assigned to the assignment statement on the execution path of the second object code, to determine whether position information constituting the read association matches position information in the source code of the assignment statement on the execution path of the second object code, and when both of the position information do not match each other, a warning is output to suspend an operation of the second object code, and when both of the position information match each other, a process for determining whether a value assigned during execution of the second object code matches the expected value is executed.

7. The source code analyzing system according to claim 6, wherein the position information is a line number in the source code.

8. The source code analyzing system according to claim 3, wherein the library calling function is a function for designating a left-hand-value reference address of an assignment statement included in the source code as an argument, the source code converter writes the left-hand-value reference address for each of the assignment statement in each argument portion of the library calling function inserted into each of the assignment statement, and the first executing unit and the second executing units respectively acquire a value assigned to an assignment statement on each of the execution path based on the written reference address.

9. The source code analyzing system according to claim 3, wherein the library calling function is a function for designating type information describing whether a left hand value of an assignment statement included in the source code is a value type or a reference type as an argument, the source code converter generates the type information for each of the assignment statement and respectively writes the generated type information in an argument portion of each of the library calling function inserted into each of the assignment statement, and the first executing unit and the second executing unit respectively determine whether a left hand value of an assignment statement on the respective execution paths is a value type or a reference type based on the written type information, and when the left hand value of the assignment statement on the respective execution paths is a value type, the value assigned to the assignment statement on the respective execution paths is acquired, and when the left hand value of the assignment statement on the respective execution paths is a reference type, the value assigned to the assignment statement on the respective execution paths is not acquired.

10. The source code analyzing system according to claim 1, wherein the second executing unit overwrites a value assigned to an assignment statement on an execution path of the second object code by the expected value, and then the second object code is operated based on the overwritten expected value.

11. A source code analyzing method comprising:

generating a first object code that executes in a first execution environment according to a first endian variable memory system by building a source code;

executing an execution-trace outputting process in which the first object code is executed to sequentially acquire values assigned to an assignment statement on an execution path of the first object code, and association between the acquired value and the assignment statement is sequentially output as an execution trace;

generating a second object code that executes in a second execution environment according to a second endian variable memory system, which is different from the first endian variable memory system, by the source code; and executing a dependent-part specifying process in which the second object code is executed to acquire a value assigned to an assignment statement on an execution path of the second object code during execution of the second object code, every time a value is assigned, determining whether the acquired value assigned to the assignment statement during execution of the second object code matches an expected value, which is a value obtained based on the execution trace and assigned to the assignment statement on the execution path of the second object code, and when both values are different from each other, overwriting the value assigned during execution of the second object code by the expected value and outputting a report of position information of the assignment statement in the source code, indicating that the assignment statement in which the assigned value during execution of the second object code is overwritten by the expected value is a part dependent on an endian variable memory system.

12. The source code analyzing method according to claim 11, wherein the generating the first object code includes first linking the source code to a first library, which is a library for performing the execution-trace outputting process, and the generating the second object code includes second linking the source code to a second library, which is a library for performing the dependent-part specifying process.

13. The source code analyzing method according to claim 12, further comprising inserting a library calling function into an assignment statement included in the source code, wherein the first linking is linking the first library to the library calling function inserted into the source code, and the second linking is linking the second library to the library calling function inserted into the source code.

14. The source code analyzing method according to claim 11, wherein the performing the dependent-part specifying process includes designating a value obtained by describing a value assigned to the assignment statement on the execution path of the first object code described in the execution trace according to the second endian variable memory system as the expected value.

15. The source code analyzing method according to claim 11, wherein
the performing the dependent-part specifying process includes:
receiving an input of an address range specification for specifying a range of a memory address to be write-accessed according to the first endian variable memory system; and
designating a value describing a value assigned to the assignment statement on the execution path of the first object code described in the execution trace according to the first endian variable memory system as an expected value, when a storage address of a value assigned to the assignment statement during execution of the second object code is included in a range specified by the address range specification, or designating a value describing a value assigned to the assignment statement on the execution path of the first object code described in the execution trace according to the second endian variable memory system as an expected value, when the storage address of the value assigned to the assignment statement is not included in the range specified by the address range specification.

16. The source code analyzing method according to claim 11, wherein
the execution trace is information in which association between the acquired value assigned to the assignment statement on the execution path of the first object code and position information of the assignment statement in the source code is described in order of appearance on the execution path of the first object code, and
the performing the dependent-part specifying process includes reading one of the association in order of description in the execution trace, every time a value is assigned to the assignment statement on the execution path of the second object code, to determine whether position information constituting the read association matches position information in the source code of the assignment statement on the execution path of the second object code, and when both of the position information do not match each other, outputting a warning to suspend an operation of the second object code.

17. The source code analyzing method according to claim 16, wherein the position information is a line number in the source code.

18. The source code analyzing method according to claim 13, wherein
the library calling function is a function for designating a left-hand-value reference address of an assignment statement included in the source code as an argument,
the inserting includes writing the left-hand-value reference address for each of the assignment statement in each argument portion of the library calling function inserted into each of the assignment statement, and
the performing the execution-trace outputting process and the performing the dependent-part specifying process respectively include acquiring a value assigned to an assignment statement on each of the execution path based on the written reference address.

19. The source code analyzing method according to claim 13, wherein
the library calling function is a function for designating type information describing whether a left hand value of an assignment statement included in the source code is a value type or a reference type as an argument,
the inserting includes generating the type information for each of the assignment statement and respectively writing the generated type information in an argument portion of each of the library calling function inserted into each of the assignment statement, and
the performing the execution-trace outputting process and the performing the dependent-part specifying process respectively include determining whether a left hand value of an assignment statement on the respective execution paths is a value type or a reference type based on the written type information, and acquiring the value assigned to the assignment statement on the respective execution paths when the left hand value of the assignment statement on the respective execution paths is a value type, or not acquiring the value assigned to the assignment statement on the respective execution paths when the left hand value of the assignment statement on the respective execution paths is a reference type.

20. The source code analyzing method according to claim 11, wherein the performing the dependent-part specifying process includes overwriting a value assigned to an assignment statement on an execution path of the second object code by the expected value, and then operating the second object code based on the overwritten expected value.

* * * * *